US 6,549,964 B1

United States Patent
Lai et al.

(10) Patent No.: US 6,549,964 B1
(45) Date of Patent: Apr. 15, 2003

(54) DELAYED TRANSACTION METHOD AND DEVICE USED IN A PCI SYSTEM

(75) Inventors: Jiin Lai, Taipei (TW); Chau-Chad Tsai, Taipei (TW); Chen-Ping Yang, Taipei (TW); Sheng-Chang Peng, Taipei (TW); Tse-Hsien Wang, Taoyuan Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/451,820

(22) Filed: Nov. 30, 1999

(30) Foreign Application Priority Data

Apr. 23, 1999 (TW) .......................... 88106505 A

(51) Int. Cl.$^7$ ............................................. G06F 13/00
(52) U.S. Cl. ...................... 710/107; 710/100; 710/305; 710/310; 710/110
(58) Field of Search ................. 710/305, 310, 710/100, 107, 112

(56) References Cited

U.S. PATENT DOCUMENTS 6,195,722 B1 * 2/2001 Ram et al. ................. 710/310

* cited by examiner

Primary Examiner—Xuan M. Thai
(74) Attorney, Agent, or Firm—J.C. Patents

(57) ABSTRACT

A delayed transaction method and system to handle multiple delayed transactions in a PCI system is disclosed. When the responder accepts a first and second request from an initiator but can not immediately respond to the first and second request, the responder generates a first and a second defer identifier corresponding to the initiator, respectively. When data transfer between the responder and the initiator corresponding to the first request is completed and data is ready for transfer corresponding to the second request, the responder immediately issues a second buffer identifier along with the data requested corresponding to the second request. Thus, data transfer between the initiator and the responder based on the second buffer identifier corresponding to the second request can proceed.

14 Claims, 9 Drawing Sheets

DELAYED TRANSACTION METHOD AND DEVICE USED IN A PCI SYSTEM

CROSS-REFERENCE TO RELATED APPLICATION

This application claims the priority benefit of Taiwan application serial no. 88106505, filed Apr. 23, 1999. The present application is related to copending application filed on the same date as this application, entitled "PCI SYSTEM CONTROLLER CAPABLE OF DELAYED TRANSACTION" by LAI et al., currently pending.

BACKGROUND OF THE INVENTION

1. Field of Invention The present invention generally relates to a method and device for controlling peripheral devices, and more particularly to a method and device for data transfer on a peripheral component interconnection (PCI) bus.

2. Description of Related Art

FIG. 1 show a computer system architecture using a peripheral component interconnect (PCI) system, including a central processing unit 10, a PCI bus 14, a system memory 11, a host bridge 12, and a plurality of PCI-compatible peripheral masters. The PCI-compatible peripheral masters, such as a graphic adapter 16a, expansion bus bridge 16b, local area network (LAN) adapter 16c, and small computer system interface (SCSI) host bus adapter 16d, etc, are connected to the PCI bus 14. Every master can send a request signal REQ to ask for permission to use the PCI bus 14.

An arbiter located in the host bridge 12 can issue a grant signal GNT to allow the master to use the PCI bus 14.

FIG. 2 is a timing diagram of various control signals illustrating a read transaction executed on a conventional (standard) PCI bus. Data transfer between the PCI-compatible devices (such as masters or the north bridge in a computer chipset) are controlled by the interface control signals. A cycle frame signal FRAME is asserted by an initiator (masters or north bridge) to indicate the beginning and duration of an access. When the FRAME signal remains at the low level, the data transaction is continuing. At this stage, a valid address will be present on the address/data AD bus during the address phase. A valid bus command satisfying the PCI specifications will also be present on, the command/byte enable CBE [3:0] lines, indicating to a target that the data transaction requested by the initiator. The 4-bits CBE lines are encoded into 16 different commands, which are well defined under the PCI specifications. After the valid address was issued, data to be transferred are placed on the address/data AD bus, which is called a data phase. During the data phase, the CBE lines are used as Byte Enables, which are valid for the entire data phase and determine which byte lanes carrying meaningful data. When the FRAME signal is deasserted, the transaction is in the final data phase or has been completed.

An initiator ready signal IRDY and a target ready signal TRDY are used to indicate whether the initiator and the target are ready for data transfer. During a write operation, the IRDY signal indicates that valid data is present on the AD lines. During a read operation, it indicates the initiator is prepared to accept data. Wait cycles are inserted until both the IRDY and TRDY are asserted together. As for the TRDY signal, it indicates that valid data is present on the AD lines during a read operation.

During a write operation, it indicates that the target is prepared to accept data. A stop signal STOP indicates that the current target is requesting the initiator to stop the current transaction The duration to proceed and complete a data transfer on a PCI bus is called a bus transaction 20, including an address phase 22 followed by one or more data phases, for examples, 24a, 24b, and 24c. Every data phase 24a,/b/c further comprises a wait cycle 26a/b/c and a data transfer cycle 28a/b/c.

To show how the PCI system works, a read transaction is illustrated by referencing to the various control signals in the timing diagram in FIG. 2. In cycle T1, a FRAME signal is asserted by the initiator to indicate that data transfer is under way. AD bus contains a start address to specify a target while the CBE contains a valid bus command during the address phase. During the data phase, the CBE contains valid byte enable information during the entire data phase, including 24a, 24b, and 24c. In cycle T2, which is the wait cycle 26a of the data phase 24a, IRDY is asserted by the initiator indicating that the initiator is ready to accept data, while the target is not yet ready for data transfer. In cycle T3, the target is ready to send data and asserts TRDY. When both IRDY and TRDY are asserted in data transfer cycle 28a, data is transferred between the initiator and the target. The target deasserts TRDY in cycle T4, indicating the end of this data transaction, and prepares data for the second data transfer cycle, which is the wait cycle 26b of the data phase 24b. In cycle T5, the target is ready for data transfer by asserting TRDY again. When both IRDY and TRDY are asserted in data transfer cycle 28b, data is transferred between the initiator and the target. When the initiator is not ready to complete the last transfer, IRDY is deasserted in cycle T6. Since TRDY is still asserted at this stage, thus, the wait cycle 26c is initiated by the initiator. The initiator is ready again in cycle T7 by asserting IRDY. When both IRDY and TRDY are asserted in data transfer cycle 28c, data is transferred from the target to the initiator, and an entire read transaction is completed.

Under the PCI specifications, for example, version 2.2, there is a delayed transaction method. The delayed transaction is used by targets that cannot complete the initial data phase within the requirements of this specification. There are two types of devices that will use the delayed transaction: I/O controllers and bridges. In general, I/O controllers will handle only a single delayed transaction at a time, while bridges may choose to handle multiple delayed transactions to improve system performance.

A conventional delayed transaction progresses to completion in three phases:

1. Request by the master.
2. Completion of the request by the target.
3. Completion of the transaction by the master.

During the entire delayed transaction process, the master will repeatedly issue request signals, retain the privilege to use the PCI bus, and continuously send polling signals to the target.

For a conventional delayed transaction in a PCI system, the master will repeatedly issue request signals to the PCI bus if a transaction is retried. The repeatedly issued requests to the PCI bus until data is ready for transfer results in low utilization of the PCI bus without substantial data transfer.

SUMMARY OF THE INVENTION

The present invention provides a delayed transaction method for a PCI system, in which time frame required between two consecutive data acquisition cycles can be reduced in a multiple delayed transaction. The responder in the delayed transaction method functions like a master, which can automatically transfer data to the initiator which issues the request. Also, when the responder is not ready for data transfer, a defer identifier can be generated, based on which data can be transferred to the initiator which issues the request when the data is ready. Furthermore, a device which implements the delayed transaction method for the PCI system is provided in the present invention.

In accordance with the foregoing and other objectives of the present invention, a delayed transaction method and system used in a PCI system are provided. The delayed transaction method includes an initiator and a responder connected to a PCI bus, through which data is transferred. The delayed transaction method comprises the steps as follows.

The initiator issues a first request signal to use the PCI bus to access data in the responder; When the responder accepts the first request signal but can not immediately respond to the first request signal, the responder generates a first defer identifier corresponding to the first request signal; The responder issues a stop signal and the first defer identifier; The initiator issues a second request signal to use the PCI bus to access data in the responder; When the responder accepts the second request signal but can not immediately respond to the second request signal, the responder generates a second defer identifier corresponding to the second request signal; The responder issues a stop signal and the second defer identifier; When the data is readily available to respond to the first request signal, the responder issues the first defer identifier to the initiator; The initiator prepares to transfer data based on the first defer identifier from the responder corresponding to the first request signal; When the initiator is ready, data transfer between the initiator and the responder begins corresponding to the first request signal; When data transfer corresponding to the first request signal between the responder and the initiator is completed and data is readily available corresponding to the second request signal, the responder issues only a second buffer identifier of the second defer identifier; Based on the second buffer identifier, data transfer between the initiator and the responder begins corresponding to the second request signal.

The first defer identifier includes a defer address and a first buffer identifier; the second defer identifier includes the defer address and a second buffer identifier. The defer address corresponds to the initiator, the first buffer identifier corresponds to a first transaction procedure within the responder, and the second buffer identifier corresponds to a second transaction procedure within the responder. When data transfer corresponding to the first request signal is completed, the initiator issues a stop signal to terminate the data transfer between the initiator and the responder corresponding to the first request signal.

In addition, hardware devices, which implement the delayed transaction method in the PCI system, are also disclosed, in which a FRAME signal is kept asserted while the buffer identifier on the CBE line is changed when data is readily available from the target (responder). Thus, time frame required between two consecutive data acquisition cycles in a multiple delayed transaction can be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
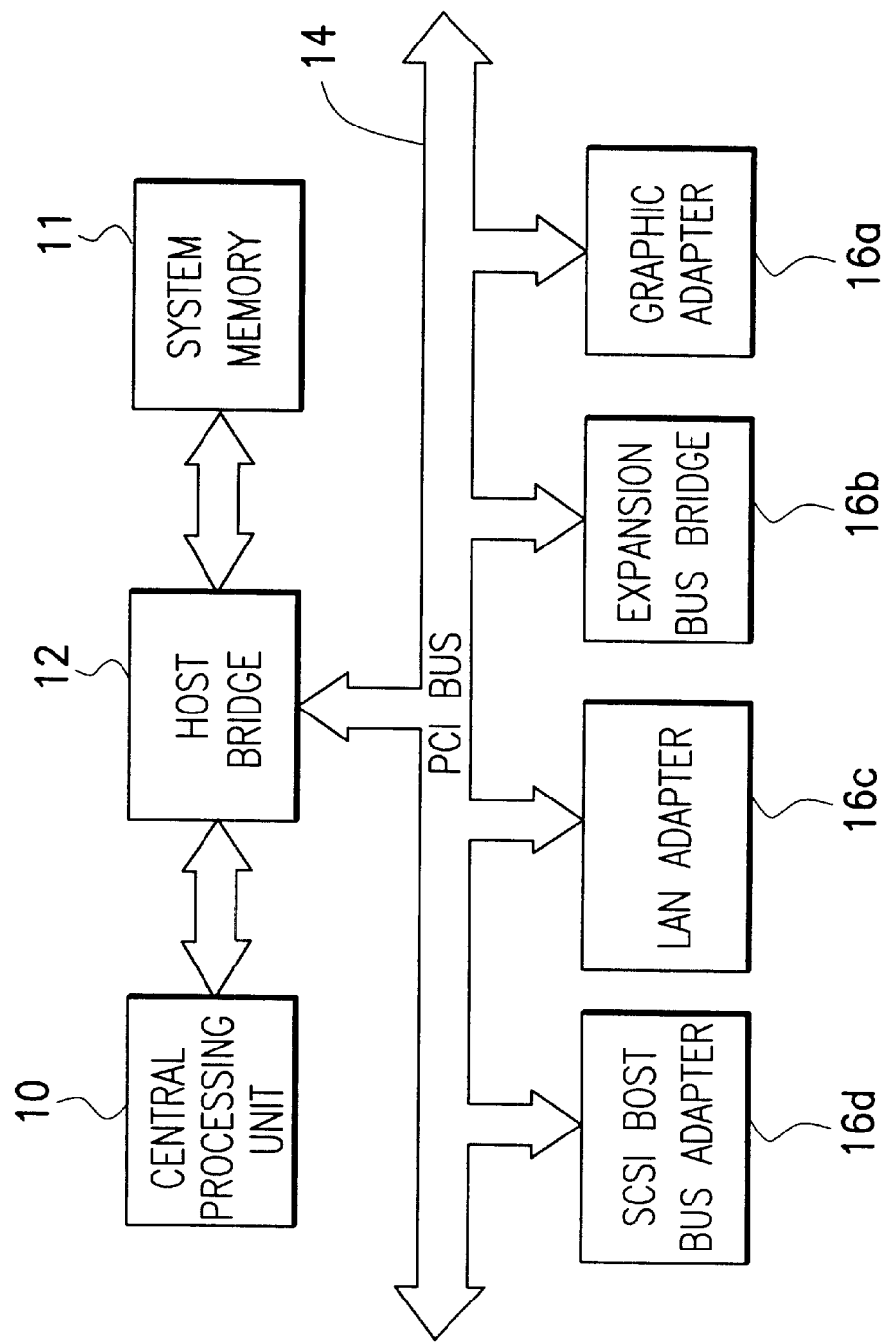
FIG. 1 is a schematic diagram of a computer system architecture using a peripheral component interconnect (PCI) system.
Figure 2:
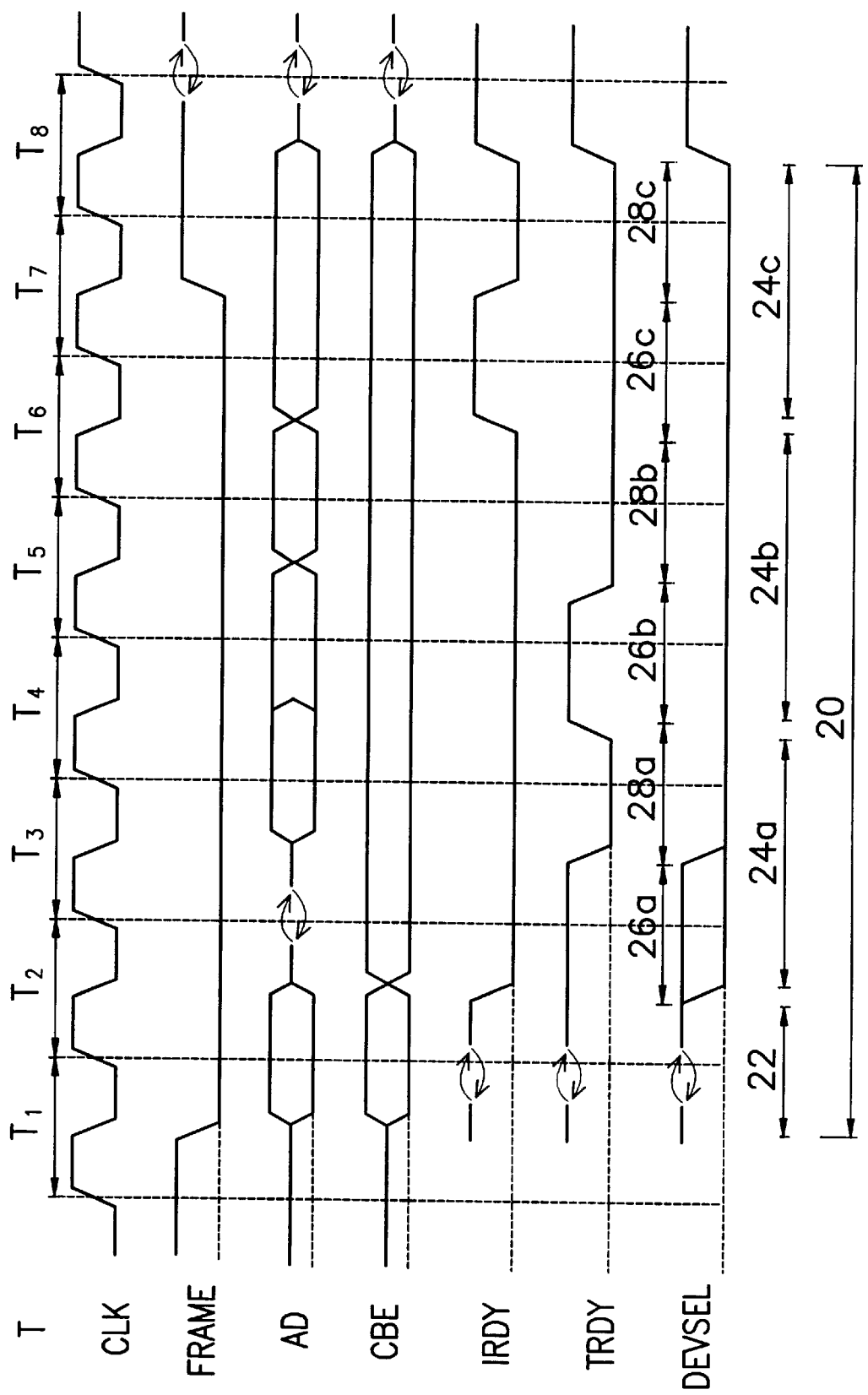
FIG. 2 is a timing diagram of various control signals illustrating a read transaction executed on a conventional PCI bus.

Reference will now be made in detail to the present preferred embodiments of the invention, examples of which are illustrated in the accompanying drawings. Wherever possible, the same reference numbers are used in the drawings and the description to refer to the same or like parts.

Figure 3:
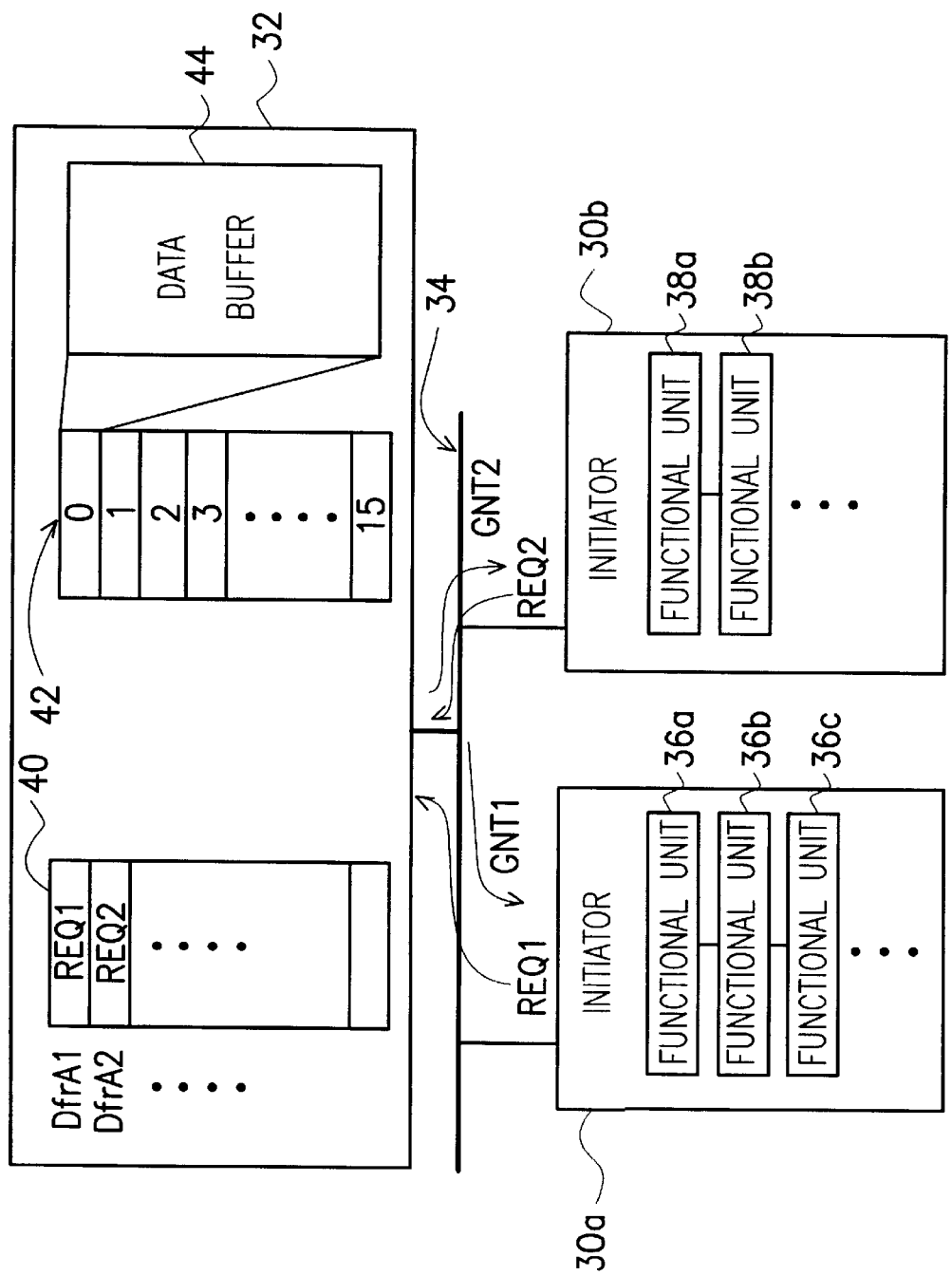
FIG. 3 is a schematic block diagram illustrating a delayed transaction method for a PCI system according to a preferred embodiment of the present invention.

Refer to FIG. 3, which shows a schematic block diagram illustrating the delayed transaction method for a PCI system according to a preferred embodiment of the present invention. The block diagram comprises initiators 30a, 30b, and a responder 32, all connected to a system bus, such as a PCI bus 34 that is only used as an example for descriptions. The initiator 30a and 30b are PCI-compatible masters, for example, LAN adapter, expansion bus bridge, or SCSI host bus adapter, etc. The responder 32 is, for example, the north bridge in the computer chipset. The initiators 30a and 30b which comprise a plurality of function units can issue request signals REQ1 and REQ2, respectively, to ask for permission to use the PCI bus 34. On the other hand, the responder 32 can issue grant signals GNT1 and GNT2 to the initiators 30a and 30b, respectively, to use the PCI bus 34, depending on the status of the PCI bus 34.

When a system, for example, a computer system, is initialized, the PCI-compatible peripheral devices connected to the PCI bus 34, for example, the initiators 30a and 30b in FIG. 3, can request a certain amount of memory, for example, IMB, which is allocated by a basic input output system (BIOS). The BIOS assigns addresses for the initiators 30a and 30b as their defer addresses and save these addresses into the responder 32.

When the responder 32 accepts the request issued by the initiator 30a, but cannot immediately respond to it, a defer identifier (DID) is generated by the responder 32 and saved in the initiator 30a. The defer identifier (DID) comprises a defer address (DfrA) corresponding to the initiator 30a, and a buffer identifier (buffer_id) corresponding to a transaction procedure within the responder 32. The buffer identifier (buffer_id) represented by 4 bits can support 16 function units.

When the initiator 30a asserts FRAME and sends out address and command on the PCI bus 34, a stop signal STOP is asserted if the target, i.e., the responder 32, is not ready to transfer data to the initiator 32. Also, a defer identifier DID including a defer address (DfrA) corresponding to the initiator 30a, and a buffer identifier (buffer_id) corresponding to a transaction procedure within the responder 32 is placed on the AD bus. The responder 32 comprises a transaction queue 42, in which every transaction corresponds to a buffer identifier buffer_id. The buffer_id then corresponds to a data buffer 44, which stores data to be sent to the initiator 30a, corresponding to the buffer_id. When data in the data buffer 44 within the responder 32 is ready to respond to the request from the initiator 30, the responder 32 issues the defer identifier DID on the AD bus. The initiator 30a, according to the defer identifier DID, prepares to accept data from the responder 32. When the initiator 30a, is ready, data transfer between the initiator 30a and the responder 32 begins.

From the above-mentioned descriptions, the spirit of the present invention is that the target functions act like an initiator when transfer data back. During a conventional delayed transaction, there is no defer identifier DID. Consequently, the initiator does not know when exactly the target is ready for data transfer. The initiator needs to continuously issue polling signals to the target, resulting in poor utilization efficiency of the PCI bus. The target, according to the delayed transaction method of the present invention, can automatically transfer data to the initiator once the data is ready. Therefore, the initiator only needs to issue the request command once and the target can generate a defer identifier DID if required. When the target is ready, data can be correctly transferred to the initiator which issued the request signal.

Figure 4:
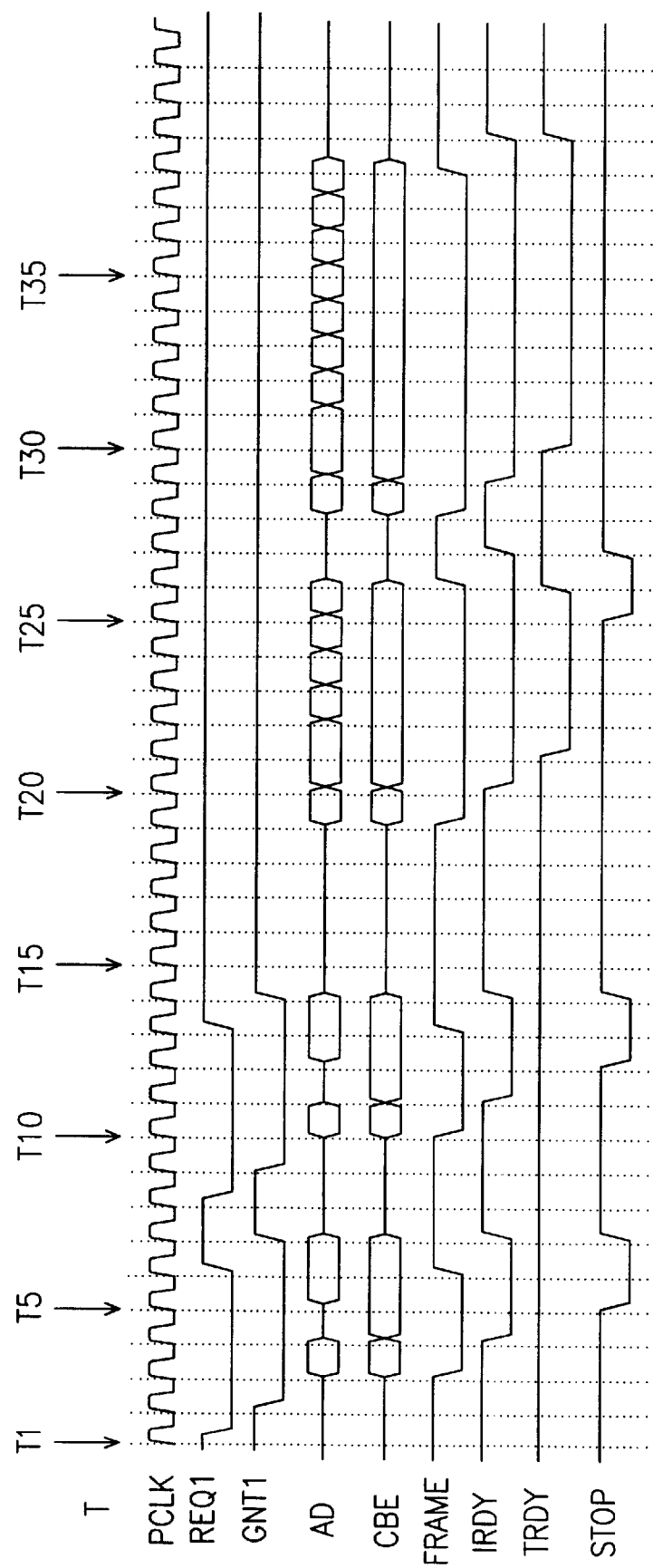
FIG. 4 is a timing diagram of various control signals illustrating the use of a multiple delayed transaction method to access data on a PCI bus.

First Embodiment of the Present Invention:

Reference is made to FIG. 4, which shows a timing diagram of various control signals illustrating the use of a multiple delayed transaction method to access data on a PCI bus. The initiator 30a, in FIG. 3 issues two read requests to ask for permission to use the PCI bus 34. These two requests come from two different function units, for example, 36a and 36b, in the same initiator 30a.

In cycle T1, the initiator 30a asserts a request signal $REQ_{1st}$ for the function unit 36a to use the PCI bus 34; in cycle T8, the initiator 30a asserts a request signal $REQ_{2nd}$ for the function unit 36b to use the PCI bus 34. The responder 32 asserts a grant signal GNT1 in cycles T2 and T9 to allow the initiator 30a to use the PCI bus 34.

In cycle T3, a FRAME signal is asserted by the initiator 30a, indicating that data transfer can proceed. Also, a valid address and a read command and byte enable information are also placed on the AD bus and CBE line, respectively. The initiator 30a asserts IRDY on the rising edge of cycle T4, indicating that the initiator 30a, is ready. However, at this time TRDY is not asserted by the responder 32, indicating that the responder 32 is not ready to transfer data to the initiator 30a. Instead, a stop signal STOP and a defer identifier DID1 are generated by the responder 32. The defer address DID1 includes a defer address DfrA and a buffer identifier buffer_id1. The defer address DfrA and the buffer identifier buffer_id1 are stored in a buffer 40 and a transaction queue 42 as shown in FIG. 3, respectively. The buffer identifier buffer_id1 indicates that data is to be transferred to the function unit 36a of the initiator 30a. In cycle T5, the responder 32 asserts a stop signal STOP, acknowledging the initiator 30a to deassert the FRAME signal.

In cycle T10, a second FRAME signal is asserted by the initiator 30a, indicating that data transfer corresponding to the function unit 36b is to proceed. Also, a valid address and a read command are also placed on the AD bus and CBE line, respectively. The initiator 30a asserts IRDY on the rising edge of cycle T11, indicating that the initiator 30a is ready. However, at this time TRDY is not asserted by the responder 32, indicating that the responder 32 is not ready to transfer data to the function unit 36b of the initiator 30a. Instead, a stop signal STOP and a defer identifier DID2 are generated by the responder 32. The defer address DID1 includes the defer address DfrA and a buffer identifier buffer_id2. The defer address DfrA and the buffer identifier buffer_id are stored in the buffer 40 and the transaction queue 42 as shown in FIG. 3, respectively. The buffer identifier buffer_id2 indicates that data is to be transferred to the function unit 36b of the initiator 30a. In cycle T12, the responder 32 asserts the stop signal STOP, acknowledging the initiator 30a to deassert the FRAME signal.

In cycles T5 and T12, STOP is asserted by the responder 32, so that FRAME is deasserted in cycles T6 and T13 corresponding to function units 36a and 36b, respectively. The initiator 30a, deasserts request signal REQ1 in cycles T6 and T13. After STOP is deasserted in cycles T6 and T13, the responder 32 (i.e., target) performs an internal access required corresponding to the defer identifier DID1 and DID2, respectively.

When the internal access is completed, the responder 32 fetch the defer address DfrA and the buffer identifiers buffer_id1 and buffer_id2 from the buffer 40 and the transaction queue 42. The responder 32 then places the defer address DfrA on the AD bus and a memory write command on the CBE line in cycle T19. At the same time, the responder 32 asserts a FRAME for data transfer. In cycle T20, the buffer identifier buffer_id1 is placed on the CBE line and the responder 32 asserts IRDY, indicating that the responder 32 is ready to send data back to the initiator. In cycle T21, the initiator 30a asserts TRDY to begin a data acquisition cycle (cycle T22 to cycle T26). Since the initiator 30a, stores the defer identifier DID1, which includes the buffer identifier buffer_id1, the initiator 30a, knows the data indicated by the buffer identifier buffer_id1 are to be transferred to the function unit 36a.

When data transfer to the function unit 36a is completed, the initiator 30a, issues a stop signal STOP in cycle T25, indicating that the data transaction is completed. Thus, FRAME and TRDY are deasserted in cycle T26, and IRDY is deaserted in cycle T27.

In cycle T28, the responder 32 places the defer address DfrA on the AD bus and a memory write command on the CBE line. In the same time, the responder 32 asserts the FRAME signal for data transfer. In cycle T29, the buffer identifier buffer_id2 is placed on the CBE line, the responder 32 asserts IRDY, indicating that the responder 32 is ready to send data back to the initiator. In cycle T30, the initiator 30a asserts TRDY to begin a data acquisition cycle (cycle T31 to cycle T38). Since the defer identifier DID2 is stored in initiator 30a, including the buffer identifier buffer_id2, data can be correctly transferred to the function unit 36b according to the buffer identifier buffer_id2.

If two or more function units request for a passive delayed transaction and the responder (acts as target) 32 returns the data to the initiator 30a, with two separated write cycles, the above-mentioned method is not an efficient way. When the responder 32 returns the whole cache line while the initiator 30a, needs only part of the data, then the STOP signal (for example, cycle T25 in FIG. 4) needs to be asserted to terminate the transaction.

Note that data is available corresponding to the request from the second function unit 36b though the stop signal STOP is asserted in cycle T25. However, the acquisition of these data is delayed for another FRAME (cycle T28 in FIG. 4) to be asserted, which causes wastes in utilizing the PCI bus including the arbitration and the address phase of the PCI transaction. Refer to FIG. 4, there are at least 4 cycles T26–T30 have been wasted between two data acquisition cycles (cycles T22–T26 and cycles T31–T38).

To eliminate the cycle time wasted between two data acquisition cycles when the initiator 30a asserts STOP to terminate the transaction corresponding to the first function unit 36a, an enhanced delayed transaction method for the PCI system is disclosed, which can be used to communicate between devices with similar operation. Typical applications include the north bridge and the south bridge, which are separated by the PCI bus, in a computer system.

Figure 5:
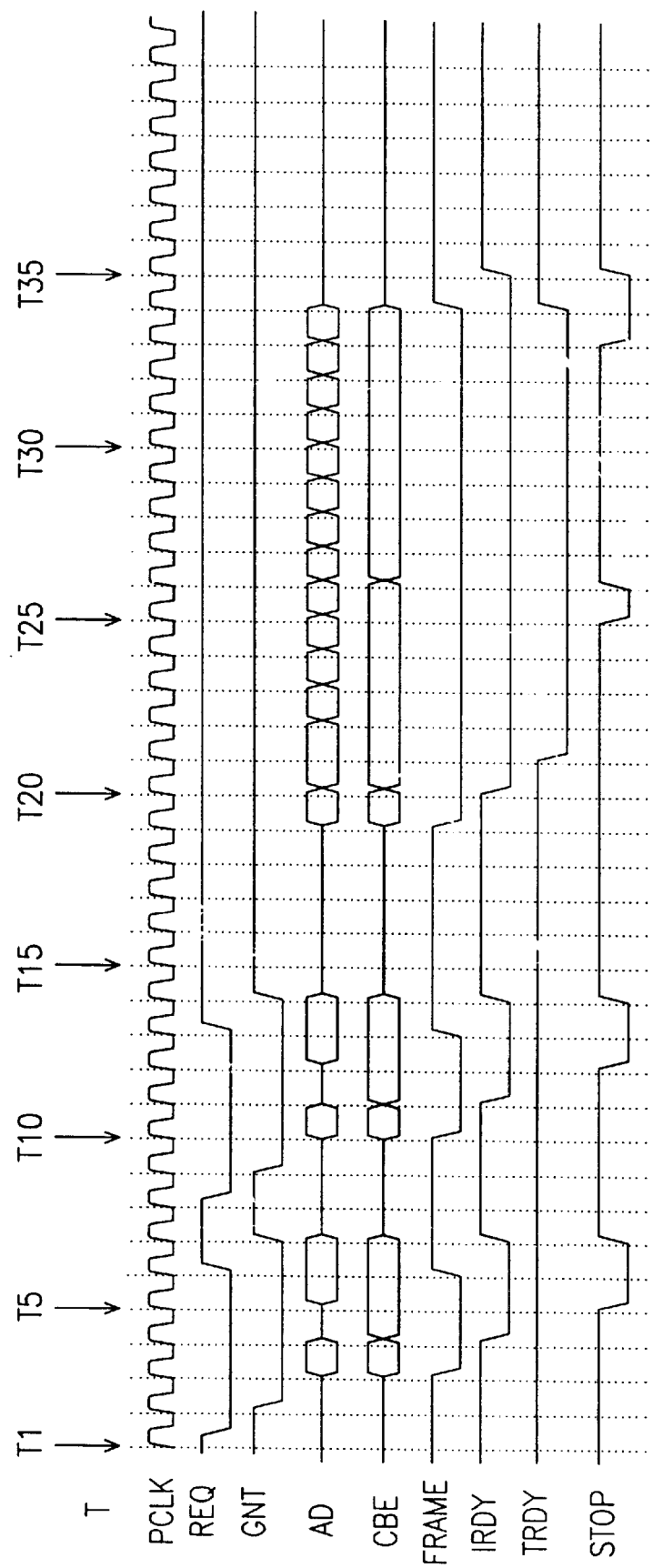
FIG. 5 is a timing diagram of various control signals illustrating the use of an enhanced multiple delayed transaction method to access data on a PCI bus.

Refer to FIG. 5, which shows a timing diagram of various control signals illustrating the use of an enhanced multiple delayed transaction method to access data on a PCI bus. The initiator 30a as shown in FIG. 3 issues two requests for permission to use the PCI bus 34. These two requests comes from two different function units, for example, 36a and 36b, of the same initiator 30a.

On the rising edge of cycle TI, the initiator 30a, issues a first request signal $REQ_{1st}$ for the function unit 36a to use the PCI bus 34 to access data from the responder 32. The responder 32 issues a grant signal GNT1 to the initiator 30a, on the rising edge of cycle T2, indicating that the first request signal $REQ1_{1st}$ is accepted. However, at this time TRDY is not asserted by the responder 32, indicating that the responder 32 is not ready to transfer data to the initiator 30a, corresponding to the first request $REQ1_{1st}$. Thus, a first defer identifier DIDI, including a defer address DfrA corresponding to the initiator 30a and a first buffer identifier buffer_id1 corresponding to a first transaction procedure within the responder 32, is generated by the responder 32 corresponding to the first request $REQ1_{1st}$. The first transaction procedure corresponds to the first function unit 36a.

In cycle T5, the responder 32 asserts a stop signal STOP, and places the first defer identifier DID1 on the AD bus. Then, the responder 32 performs an internal access required corresponding to the first request $REQ1_{1st}$.

In cycle T8, the initiator 30a, issues a second request signal $REQ1_{2nd}$ for the function unit 36b to use the PCI bus 34 to access data from the responder 32. The responder 32 issues a grant signal GNT1 to the initiator 30a, in cycle T9, indicating that the second request signal $REQ1_{2nd}$ is accepted. However, at this time TRDY is not asserted by the responder 32, indicating that the responder 32 is not ready to transfer data to the initiator 30a, corresponding to the second request $REQ1_{2nd}$. Thus, a second defer identifier DID2, including the above-mentioned defer address DfrA corresponding to the initiator 30a and a second buffer identifier buffer_id2 corresponding to a second transaction procedure within the responder 32, is generated by the responder 32 corresponding to the second request $REQ1_{2nd}$. The second transaction procedure corresponds to the second function unit 36b.

In cycle T12, the responder 32 asserts a stop signal STOP, and places the second defer identifier DID2 on the AD bus. Then, the responder 32 performs an internal access required corresponding to the second request $REQ1_{2nd}$.

For the function unit 36a, the initiator 30a asserts a request signal REQ1 in cycle T1 so as to request a use on the PCI bus 34. For the function unit 36b, the initiator 30a, asserts a request signal REQ1 in cycle T8 to request a use on the PCI bus 34. The responder 32 respectively responds a grant signal GNT1 at cycles T2 and T9 so as to allow the initiator 30a, to use the PCI bus 34.

In cycle T3, a FRAME signal is asserted by the initiator 30a, indicating that data transfer can proceed. Also, a valid address and a read command are also sent to the AD bus and CBE line, respectively. The initiator 30a asserts IRDY in cycle T4, indicating that the initiator 30a, is ready to accept data. However, at this time TRDY is not asserted by the responder 32, indicating that the responder 32 is not ready to transfer data to the initiator 30a. Thus, a defer identifier DID1 is generated by the responder 32, including a defer address DfrA and a buffer identifier buffer_id1. The defer address DfrA and the buffer identifier buffer_id1 are stored in the buffer 40 and the transaction queue 42, respectively. The buffer identifier buffer_id1 indicates that data is to be transferred to the function unit 36a of the initiator 30a.

In cycle T10, a second FRAME signal is asserted by the initiator 30a, indicating that data transfer corresponding to the function unit 36b can proceed. Also, a valid address and a read command are also placed on the AD bus and CBE line, respectively. The initiator 30a asserts IRDY on the rising edge of cycle T11, indicating that the initiator 30a is ready to accept data. However, at this time TRDY is not asserted by the responder 32, indicating that the responder 32 is not ready to transfer data to the function unit 36b of the initiator 30a. Thus, a defer identifier DID2 is generated by the responder 32, including the defer address DfrA and a buffer identifier buffer_id2. The defer address DfrA and the buffer identifier buffer_id2 are stored in the buffer 40 and the transaction queue 42, respectively. The buffer identifier buffer_id2 indicates that data is to be transferred to the function unit 36b of the initiator 30a. In cycle T12, the responder 32 asserts a stop signal STOP, acknowledging the initiator 30a, to deassert the request signal REQ.

In cycles T5 and T12, STOP is asserted by the responder 32, so that FRAME is deasserted in cycles T6 and T13 corresponding to function units 36a and 36b, respectively. Thus, the initiator 30a, deasserts the request signal REQ in cycles T6 and T13. After STOP is deasserted in cycles T6 and T13, the responder 32 (i.e., target) performs an internal access required corresponding to the defer identifiers DID1 and DID2.

When the internal access is completed, the responder 32 places the defer address DfrA on the AD bus and a memory write command on the CBE line in cycle T19. At the same time, the responder 32 asserts FRAME for data transfer. In cycle T20, the responder 32 places buffer_id1 on the CBE and asserts IRDY, indicating that the responder 32 is ready to send data of the first request back. In cycle T21, the initiator 30a asserts TRDY to begin a data acquisition cycle according to the buffer identifier buffer_id1. The initiator 30a, can correctly transfer data to the function unit 36a with the help of buffer_id1.

When data transfer to the function unit 36a is completed, the initiator 30a asserts STOP in cycle T25, indicating that the data transaction corresponding to the function unit 36a is completed. In cycle T26, the buffer identifier buffer_id1 corresponding to the function unit 36a on the CBE line is changed to the buffer identifier buffer_id2 corresponding to the function unit 36b. Data on the AD bus is changed accordingly. Note that FRAME, IRDY signal, and TRDY signal remain unchanged when the STOP is asserted in cycle T25. This indicates that both the initiator 30a and the responder 32 are readily available to execute a transaction.

In cycle T19, the responder 32 asserts FRAME, indicating that it is ready for data transfer with the initiator 30a. In the same time, the defer address DfrA is placed on the AD bus and a memory write command is placed on the CBE lines. In cycle T20, the responder 32 asserts IRDY, indicating that the responder 32 is ready. Data corresponding to the first request signal $REQ1_1$, is placed on the AD bus, and the first buffer identifier buffer_id1 is placed on the CBE lines. On the rising edge of cycle T21, the initiator 30a, is ready and TRDY is asserted to begin a data acquisition cycle based on the first buffer identifier buffer_id1 corresponding to the first request signal $REQ1_{1st}$.

When data transfer between the responder 32 and the initiator 30a, is completed in cycle T25 corresponding to the first request signal $REQ1_{1st}$, the initiator 30a asserts the STOP signal. The responder 32 immediately places the second buffer identifier buffer_id2 on the CBE lines and place data on the AD bus corresponding to the second request signal $REQ1_{2nd}$. A data acquisition cycle between the initiator 30a and the responder 32 based on the second buffer identifier buffer_id2 begins corresponding to the second request signal $REQ1_{2nd}$.

When the initiator 30a completes the last transfer of data corresponding to the second request signal $REQ1_{2nd}$, the initiator 30a asserts a STOP to complete the transaction in cycle T34. The initiator 30a deasserts TRDY in cycle 34, and the responder 32 deasserts FRAME. In cycle T35, the responder deasserts IRDY and the initiator deasserts STOP to finish the transaction.

In comparison with FIG. 4, the cycle time wasted in utilizing the PCI bus between two consecutive data acquisition cycles has been avoided according to enhanced delayed transaction method as illustrated in FIG. 5.

Note that FIG. 5 is for illustrating purpose only. There could be several variations based on this protocol. For example, data in cycle T25 could not be the last data requested by the initiator 30a. In this case, the initiator 30a will keep the STOP deasserted, while the responder 32 still can switch to the next delayed transaction with its buffer identifier on the CBE and data on the AD bus changed to those of the function unit 36b. By doing so, the responder 32 can transfer data to the function unit 36b according to the buffer identifier buffer_id2.

Another example is that if data appears in cycle T25 on the AD bus is the last data of the function unit 36a, or the function unit 36a doesn't need the data, then the initiator 30a asserts a STOP to terminate the first transaction. The defer identifier DID1 corresponding to the function unit 36a is changed to DID2 corresponding to the function unit 36b. Data on the AD bus is also changed to the next one. By doing so, the responder 32 can transfer data to the function unit 36b according to the buffer identifier buffer_id2.

Figure 6:
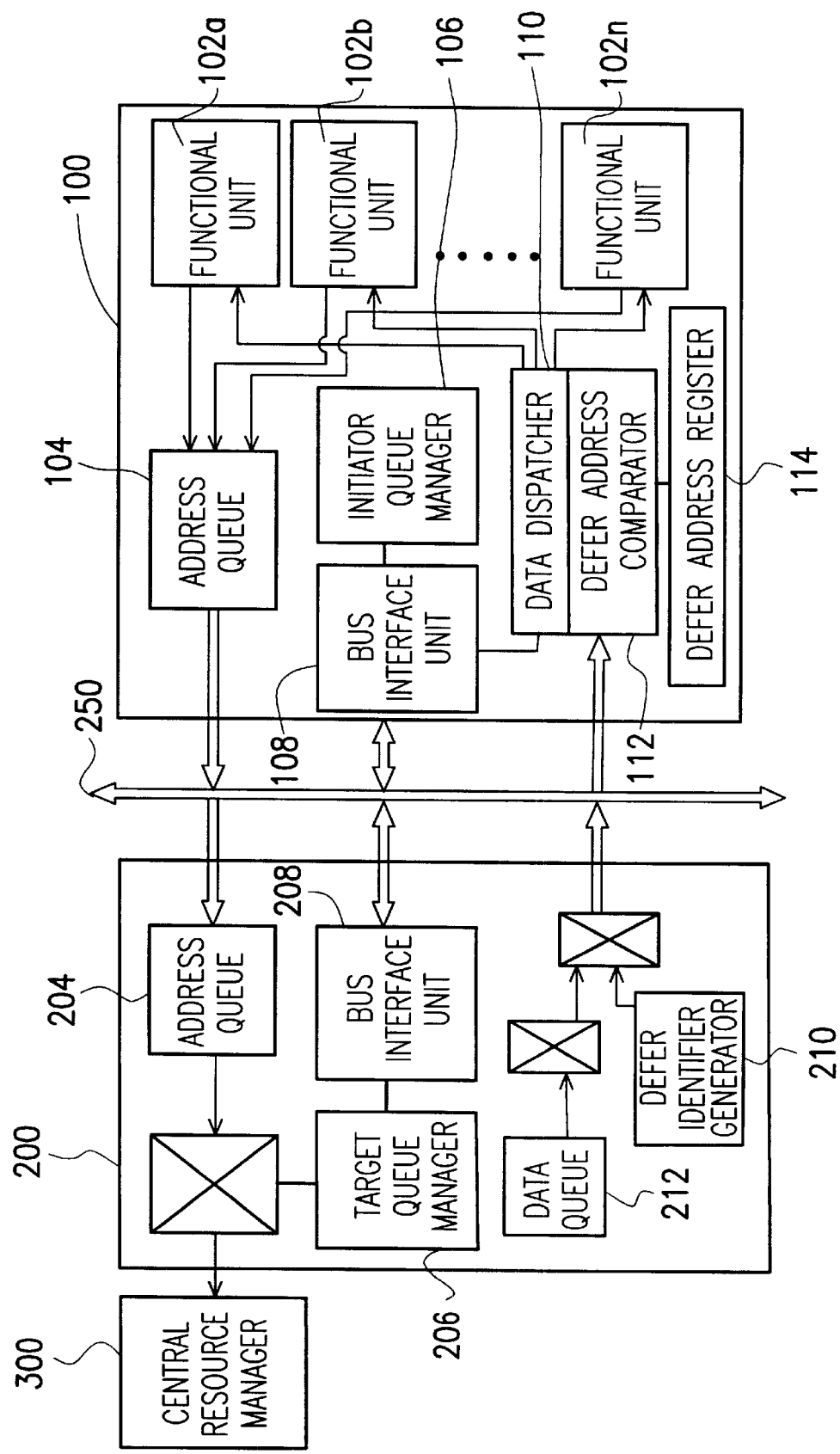
FIG. 6 is a schematic block diagram of PCI-compatible devices implementing the delayed transaction method according to a preferred embodiment of the present is invention.

From the above-mentioned descriptions, it is understood that FRAME, IRDY, and TRDY remain asserted when the responder is ready. By changing the buffer identifier on the CBE, time frame required between two consecutive data acquisition cycles can be reduced. Second embodiment of the present invention:

Refer to FIG. 6, which shows a schematic block diagram of PCI-compatible devices implementing the delayed transaction method according to a preferred embodiment of the present invention. The function unit, for example 102a in FIG. 6, in the initiator 100 requests to use the PCI bus 250. The address queue 104 and the initiator queue manager 106 in the initiator 100 then issue a request signal REQ according to the function unit 102a to an arbiter located in the responder 200 controlling a central resource manager 300. When a grant signal GNT is issued to the initiator 100, the responder (target) 200 accepts the request from the initiator 100. The initiator 100 then asserts FRAME and issues a read command to begin a data transaction. If the responder 200 is not ready after receiving a valid address from the AD bus, , the bus interface unit (BIU) 208 asserts a stop signal STOP to defer the data transaction cycle.

In the same time, a defer identifier (DID) comprising a defer address (DfrA) and a buffer identifier buffer_id along with other control signals shown in FIG. 5 are generated by a defer identifier generator 210 of the responder 200. When the data queue 212 is full, the defer identifier generator 210 will inverse the defer address DfrA to generate an invalid identifier corresponding to the initiator 100. The mentioned BIU 208 operated under the conventional PCI bus protocol (ver. 2.1) is generally a PCI-compatible master/target.

Also, the target queue manager 206 within the responder 200 will issue a request to the central resource manager 300, for example, a system memory. When data is transferred from the central resource manager 300, the target queue manager 206 issues a memory write cycle with a defer address DfrA generated by the defer identifier generator 210. The initiator 100 declares itself the owner of the target address by issuing a device select signal DEVSEL, which is specified in the PCI specifications (ver 2.1). Subsequently, a passive delayed transaction is executed to complete a data acquisition cycle.

At this time, the target queue manager 206 and the BIU 208 in the responder 200 place data stored in the data queue 212 on the AD bus, which is then transferred to the data dispatcher 110 within the initiator 100 via the PCI bus 250. The data dispatcher 110 then transfers data, according to the buffer identifier buffer_id on the command/byte enable lines CBE, to the correct function unit, for example 102a.

According to the preferred embodiment of the present invention, the BIU 108 within the initiator 100 and the BIU 208 within the responder 200 should operate according to the conventional PCI specifications. However, the BIU 108, 208 also need to work with the queue managers 106 and 206. There, BIU 108 and 208 also need to use the delayed transaction method according to the present invention to transfer data.

The capacity of the address queue 204 in the responder 200 does not have to be the same as that of the address queue 104 in the initiator 100. However, the capacity of the address queue 204 in the responder 200 is generally designed to be larger than that of the address queue 104 in the initiator 100. The reason for this arrangement is that the responder 200 is, for example, a north bridge control unit in a computer chipset, to control the system memory, while there may be a plurality of initiators connected to the PCI bus. To ensure a fair access for every initiator (master), the address queue 204 in the responder 200 needs to have a larger capacity than that of the address queue 104 of the initiators.

The above-mentioned embodiment is used to illustrate an exemplary hardware architecture of PCI-compatible devices using the delayed transaction method. Implementation of practical circuits which apply the delayed transaction method depends on the system under consideration.

Figure 7:
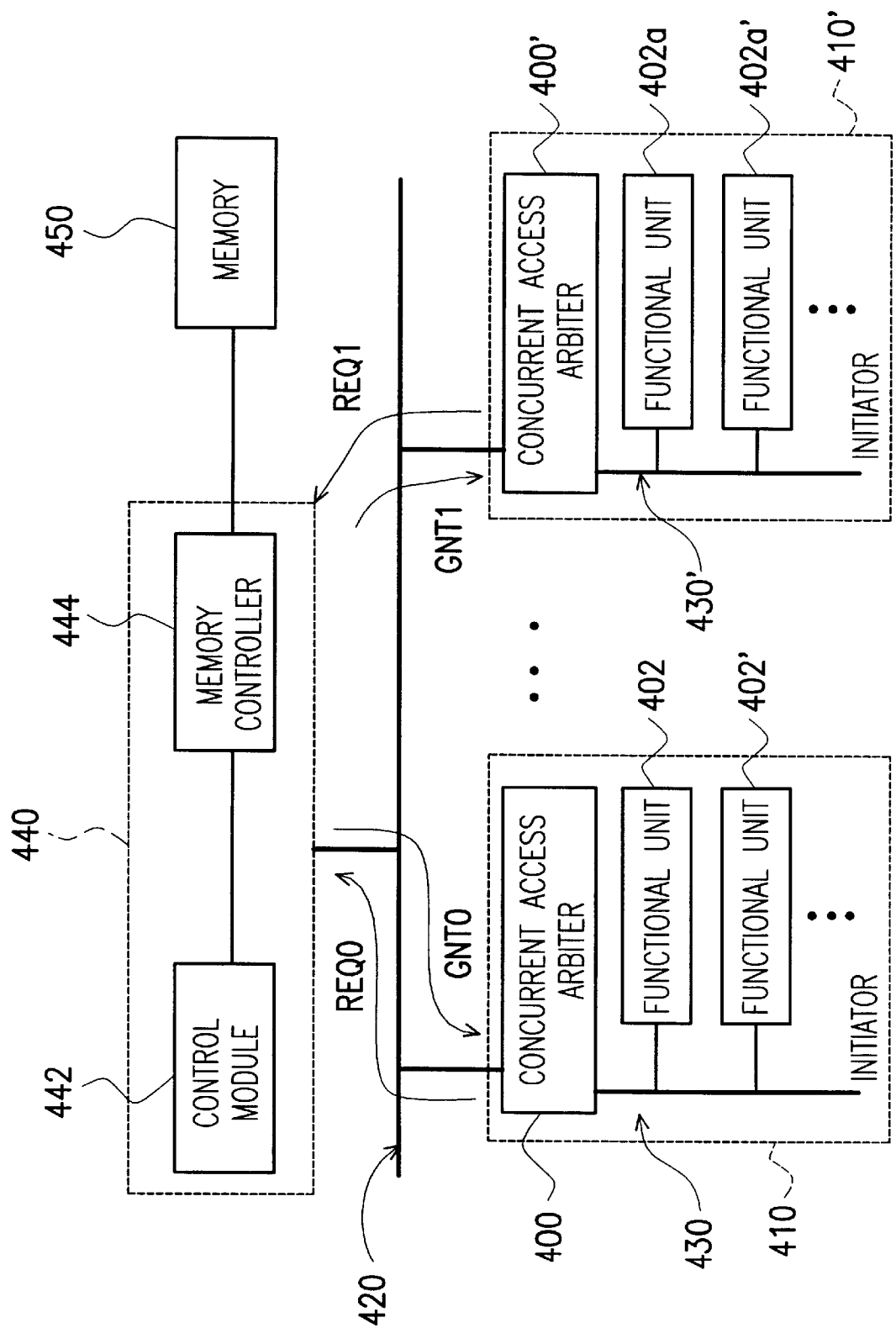
FIG. 7 is a schematic block diagram of PCI-compatible devices implementing the delayed transaction method according to another preferred embodiment of the present invention.

Third Embodiment of the Present Invention:

Refer to FIG. 7, which a schematic block diagram of PCI-compatible devices implementing the delayed transaction method according to another preferred embodiment of the present invention. The PCI bus 420 satisfies the specifications of the delayed transaction method for a PCI system.

A plurality of initiators 410, 410' are connected to the PCI bus 420. Every initiator, for example, initiator 410, includes a concurrent access arbiter (CAA 400) according to the delayed transaction method for a PCI system, which is, for example, a PCI-compatible master. Every initiator 410 can include a plurality of function units 402 which connect to CAA 400, via a conventional PCI bus 430 (for example, PCI specifications ver. 2.1), or other protocol interface 430', for example, ISA, EISA, etc. The concurrent access arbiter (CAA) 400 comprises an arbiter, which handles data transactions for the function units 402, 402' in the initiator 410.

A responder 440 also connects to the PCI bus 420. The responder 440 accepts the request signal REQ0 from the initiator 410 and returns a grant signal GNT0 to the initiator 410. During a delayed transaction, the control module 442 in the responder 440 can control the memory controller 444 to access memory 450. Also, the control module 442 can generate a defer identifier (DID), including a defer address (DfrA) corresponding to the initiator 410, and a buffer identifier buffer_id corresponding to a transaction procedure within the responder 440, if the responder 440 can not immediately respond to the request signal from the initiator 410.

Figure 8:
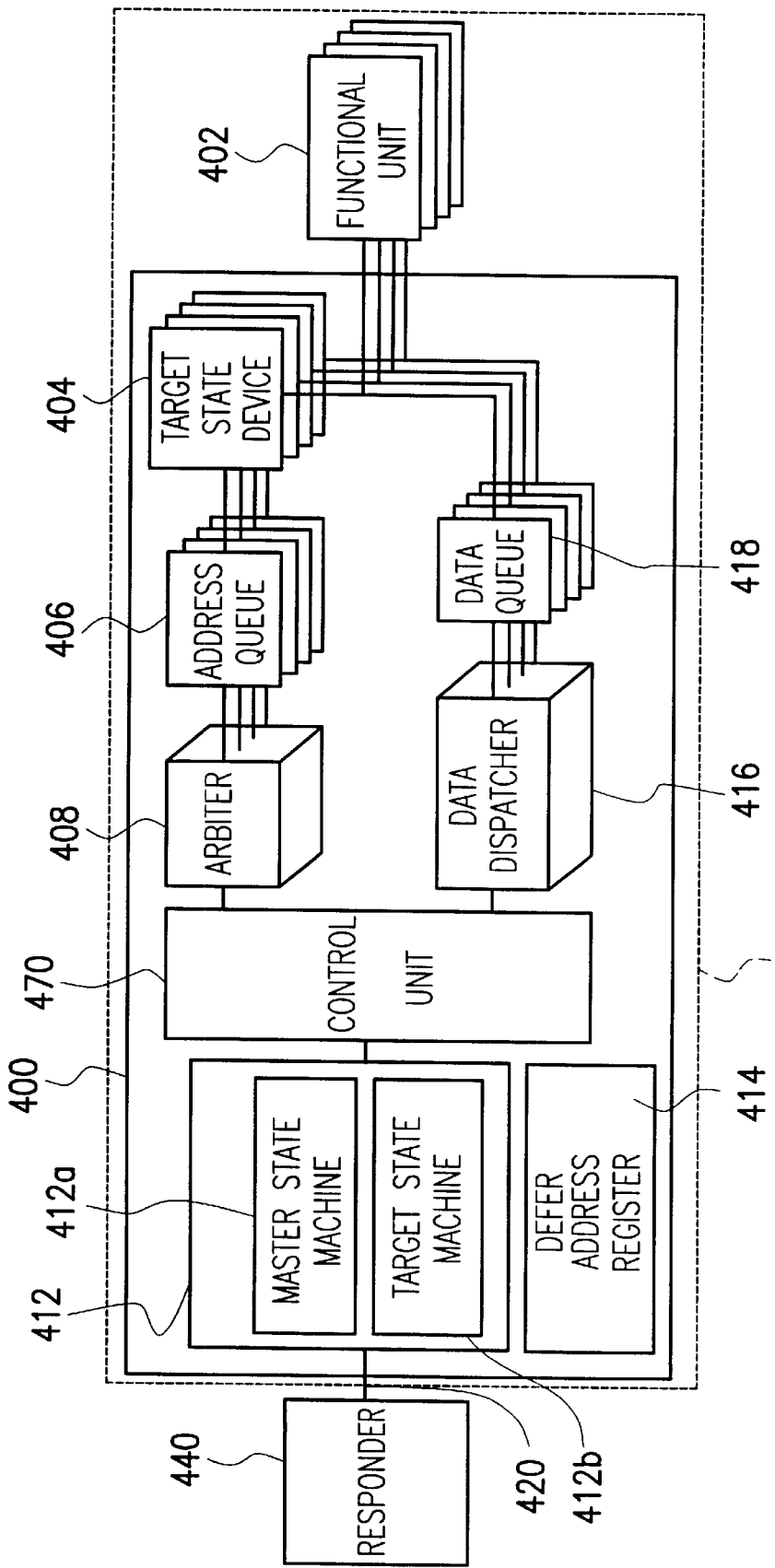
FIG. 8 is a block diagram showing the internal structure of a concurrent access arbiter (CAA) in FIG. 7.

Refer to FIG. 8, which shows a block diagram showing the internal structure of a concurrent access arbiter (CAA) 400 in FIG. 7, which is, for example, an initiator (or a PCI compatible master). The initiator 410 and the responder 440 are connected via the PCI bus 420 according to the delayed transaction method of the present invention. The responder 440 is, for example, a north bridge control unit which controls access to the system memory in the computer chipset. The initiator 410 contains a plurality of function units 402, which are connected to the CAA 400 via conventional PCI buses 430.

As shown in FIG. 8, the CAA 400 comprises a control unit 470 to control operations of a target state machine 404, an address queue 406, an arbiter 408, a state machine 412, a defer identifier register 414, a data dispatcher 416, and a data queue 418. If the function unit 402 is not connected to the CAA 400 via a conventional PCI interface, the target state machine 404 is not required. The state machine 412 further includes a master state machine 412a and a target state machine 412b. It is assumed that the function unit 402 is connected to the CAA 400 via a conventional PCI interface 430.

When a request is issued from the function unit 402, the CAA 400 acts as a target, and the function unit 402 acts as a master. The target state machine 404 records address phase status, data phase status, and other related (PCI-specified) information during the data transaction process. The address information during the address phase is stored in the address queue 406.

The initiator 410 issues a request to the responder 440 according to the request from the function unit 402. At this time, the initiator 410 acts as a master in a PCI system, while the responder 440 acts as a target. The master state machine 412a of the state machine 412 records address phase status, data phase status, and other related (PCI-specified) information during the data transaction process.

An arbiter 408 in the CAA 400 is used to arbitrate the access from the function units 402, so that every function units 402 or different requests from the same function unit can have a fair execution in the initiator 400. The arbitration in the arbiter 408 satisfies the conventional PCI specifications, for example, PCI protocol version 2.1.

When the arbiter (not shown) in the responder 440 receives the request signal from the initiator 410, the responder 440 issues a grant signal to the initiator 410 if the PCI bus 420 is not occupied, indicating that the initiator 410 can utilize the PCI bus 420. When the responder 440 can not immediately get data ready to respond to the request from the initiator 410, the responder 440 generates a defer identifier (DID), including a defer address (DfrA) corresponding to the initiator 410, and a buffer identifier buffer_id corresponding to a transaction procedure within the responder 440.

Once the responder 440 acquires the data needed by the initiator 410, it initiates a transaction with the defer address as the address. At this moment, the responder 440 acts as a master in a PCI system, and the initiator 410 acts as a target. The target state machine 412b of the state machine 412 records address phase status, data phase status, and other related (PCI-specified) information during the data transaction process.

The control unit 470 of the initiator 410 transfers data from the responder 440 to the data queue 418 having a first in first out (FIFO) structure via the data dispatcher 416. The data is then transferred to the function unit 402.

Figure 9:
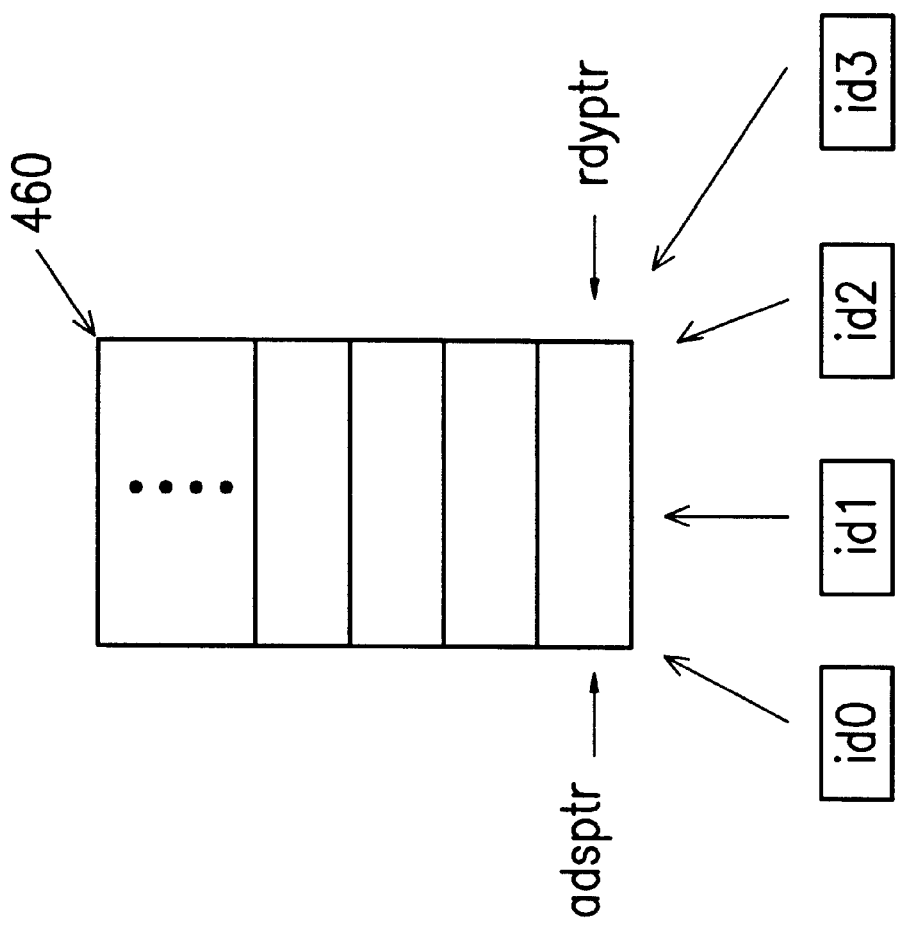
FIG. 9 is block diagram illustrating the use of a data buffer when data requests are issued by multiple function units.

Refer to FIG. 9, which shows the use of a status buffer 460 in the responder 440 when data requests are issued by multiple function units. When multiple function units request for data transfer, the responder 440 generates buffer identifiers, for example, id0, id1, id2, and id3, for each function unit issuing the request. The buffer identifiers id0–id3 correspond to different function units connected to the same or different initiator, or different requests from the same function unit. The data buffer 460 includes a start pointer, adsptr, and a ready pointer, rdyptr. The start pointer adsptr indicates the location where the status of the next identifier is to be saved into the status buffer 460. The start pointer is increased wherever a new buffer identifier status is stored in the status buffer 460. When data from the system memory 450 in FIG. 7 is ready, the ready pointer rdyptr indicates the location having the status of the ready data. The ready pointer rdyptr is increased wherever the data corresponding to the pointed buffer identifier have been transferred. By using the start pointer adsptr and the ready pointer rdyptr, data can be transferred to the correct function unit. Therefore, the PCI system according to the present invention can handle multiple delayed transactions even though the system memory can only process a single request at one time.

As a summary, the initiator 410 issues only a single request, and the responder 440 can transfer data to the function unit 402 which made the request when data is ready according to the defer address DfrA and the buffer identifier buffer_id. Therefore, the initiator 410 will not occupy the PCI bus 420 all the time, so that system performance can be significantly increased. Also, multiple function units can request for permission to use the PCI bus at the same time. The responder can assign a particular buffer identifier to each function unit so that data can be transferred to the function unit if they are readily available.

For a conventional delayed transaction used in a PCI system, the initiator (master) will repeatedly issue request signals REQ to use the PCI bus if the target (responder) is not ready. Thus, the PCI bus is continuously occupied without substantial data transfer, resulting in low utilization of the PCI bus. The initiator in the provided delayed transaction method, on the other hand, issues a single request only. The target acts as a master, which transfers data to the initiator automatically according to the defer address and the buffer identifier when data is ready. Therefore, the arbitration time required is reduced and the utilization of the PCI bus is significantly increased.

Therefore, the characteristic of the present invention is that a single request is issued by the PCI compatible master during the delayed transaction process, without the need to repeatedly issuing polling signals to inquire the target if data is ready. Thus, the PCI bus is not continuously occupied and the efficiency to use the PCI bus is increased.

Another characteristics of the present invention is that the responder immediately changes the buffer identifier and data corresponding to the next request after the previous data transfer between the responder and the initiator is completed in a delayed transaction. When the initiator and the responder are both readily available, data transfer corresponding to the next request can be proceeded, so that time frame required between two consecutive data acquisition cycles can be reduced.

Another characteristics of the present invention is that a defer identifier can be generated when the responder can not get data ready immediately. When the responder is ready, data can be transferred to the correct initiator issuing the request.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A delayed transaction method used in a bus system to transfer data between an initiator and a responder, wherein the initiator and the responder are connected to a system bus, the delayed transaction method comprising the steps of:
    issuing a first request signal from the initiator to use the bus to access data from the responder;
    generating a first defer identifier from the responder corresponding to the first request signal when the responder accepts the first request signal but can not immediately respond to the first request signal;
    issuing a stop signal and the first defer identifier from the responder;
    issuing a second request signal from the initiator to use the bus to access data from the responder;
    generating a second defer identifier again from the responder corresponding to the second request signal when the responder accepts the second request signal but can not immediately respond to the second request signal;
    issuing a stop signal and the second defer identifier from the responder;
    issuing the first defer identifier from the responder when the data in the responder is readily available to respond to the first request signal;
    preparing to transfer the data between the initiator and the responder based on the first defer identifier corresponding to the first request signal;
    transferring data between the initiator and the responder corresponding to the first request signal when the initiator is ready;
    immediately issuing only a second buffer identifier in the second defer identifier from the responder after the data transfer between the responder and the initiator is completed corresponding to the first request signal and data is readily available corresponding to the second request signal; and
    transferring data between the responder and the initiator based on the second buffer identifier corresponding to the second request signal issued by the initiator.

2. The delayed transaction method of claim 1, wherein the bus comprises a peripheral component interconnect (PCI) bus.

3. The delayed transaction method of claim 1, wherein the first defer identifier comprises a defer address and a first buffer identifier, the second defer identifier comprises the defer address and the second buffer identifier, wherein the defer address corresponds to the initiator, the first buffer identifier corresponds to a first transaction procedure within the responder and the second buffer identifier corresponds to a second transaction procedure within the responder.

4. The delayed transaction method of claim 3, wherein the initiator stores the buffer identifiers when the stop signal and the defer identifiers are issued.

5. The delayed transaction method of claim 3, wherein the buffer identifiers respectively correspond to function units of the initiator.

6. The delayed transaction method of claim 1 further comprises issuing a stop signal to terminate the data transfer between the responder and the initiator corresponding to the first request signal when the initiator has received the data from the responder according to the first request signal.

7. The delayed transaction method of claim 1 further comprises generating an invalid defer identifier corresponding to the second request signal when the responder can not accept the second request signal, indicating to the initiator that the second request signal needs to be issued again.

8. The delayed transaction method of claim 1, wherein the responder accesses data from a central resource manager after the stop signal and the first defer identifier are issued from the responder.

9. A bus system, comprising.
    a bus;
    a responder connected to the bus; and
    an initiator connected to the bus, wherein the initiator access data of the responder through the bus, wherein
    when the responder is ready for accepting a first request signal and a second request signal both issued by the initiator but the responder cannot respond to the request signals issued by the initiator immediately, the responder correspondingly generates a first defer identifier including a first buffer identifier and a second defer identifier including a second buffer identifier, which are saved in the initiator, when the responder is ready to respond to the first request signal issued by the initiator, the responder issues the first defer identifier, based on which the initiator recognizes the first defer identifier and accordingly access the data of the responder corresponding to the first request signal, when the responder and the initiator have completed accessing data corresponding to the first request signal and the responder is ready to have the data corresponding to the second buffer identifier of the second defer identifier, then the responder and the initiator simultaneously start to access data corresponding to the second request signal, where the initiator responds actions according to the second buffer identifier.

10. The bus system of claim 9, wherein the bus comprises a peripheral component interconnect (PCI) bus.

11. The bus system of claim 9, wherein the responder further comprises a defer identifier generator to generate the defer identifier.

12. The bus system of claim 9, wherein the responder further comprises a data queue to store data to be transferred to the initiator.

13. The bus system of claim 12, wherein the data queue is connected to a central resource manager.

14. The bus system of claim 9, wherein the initiator further comprises a defer address register to compare with the defer identifier generated by the responder.

* * * * *